US009026438B2

(12) United States Patent
Buck et al.

(10) Patent No.: US 9,026,438 B2
(45) Date of Patent: May 5, 2015

(54) DETECTING BARGE-IN IN A SPEECH DIALOGUE SYSTEM

(75) Inventors: Markus Buck, Biberach (DE); Franz Gerl, Neu-Ulm (DE); Tim Haulick, Blaubeuren (DE); Tobias Herbig, Ulm (DE); Gerhard Uwe Schmidt, Ulm (DE); Matthias Schulz, Westerstetten (DE)

(73) Assignee: Nuance Communications, Inc., Burlington, MA (US)

( * ) Notice: Subject to any disclaimer, the term of this patent is extended or adjusted under 35 U.S.C. 154(b) by 915 days.

(21) Appl. No.: 12/415,927

(22) Filed: Mar. 31, 2009

(65) Prior Publication Data

US 2009/0254342 A1    Oct. 8, 2009

(30) Foreign Application Priority Data

Mar. 31, 2008    (EP) .................................... 08006389

(51) Int. Cl.

| | |
|---|---|
| *G10L 15/00* | (2013.01) |
| *G10L 25/78* | (2013.01) |
| *G10L 15/22* | (2006.01) |
| *G10L 21/00* | (2013.01) |
| *G10L 13/00* | (2006.01) |
| *H04M 1/64* | (2006.01) |
| *H04M 3/42* | (2006.01) |
| *G06F 11/00* | (2006.01) |
| *G10L 17/00* | (2013.01) |

(52) U.S. Cl.
CPC ............... *G10L 25/78* (2013.01); *G10L 15/222* (2013.01); *G10L 17/00* (2013.01); *G10L 2025/786* (2013.01)

(58) Field of Classification Search
USPC ......... 704/203, 275, 233, 246, 270, 266, 231, 704/503, 9, 251, 268; 379/88.01, 208.01, 379/88.02; 726/22
See application file for complete search history.

(56) References Cited

U.S. PATENT DOCUMENTS

| 4,015,088 A | 3/1977 | Dubnowski et al. ........ 179/1 SC |
|---|---|---|
| 4,052,568 A | 10/1977 | Jankowski ................ 179/15 AS |

(Continued)

FOREIGN PATENT DOCUMENTS

EP    2 107 553 A1    10/2009    ............. G10L 11/02

OTHER PUBLICATIONS

Ittycheriah, et al.; Detecting User Speech in Barge-In Over Prompts Using Speaker Identification Methods; 6th European Conference on Speech Communication and Technology, Eurospeech '99; Budapest, Hungary; Sep. 5-9, 1999; pp. 327-330.

(Continued)

*Primary Examiner* — Pierre-Louis Desir
*Assistant Examiner* — Neeraj Sharma
(74) *Attorney, Agent, or Firm* — Daly, Crowley, Mofford & Durkee, LLP

(57) ABSTRACT

A method for detecting barge-in in a speech dialog system comprising determining whether a speech prompt is output by the speech dialog system, and detecting whether speech activity is present in an input signal based on a time-varying sensitivity threshold of a speech activity detector and/or based on speaker information, where the sensitivity threshold is increased if output of a speech prompt is determined and decreased if no output of a speech prompt is determined. If speech activity is detected in the input signal, the speech prompt may be interrupted or faded out. A speech dialog system configured to detect barge-in is also disclosed.

25 Claims, 2 Drawing Sheets

(56) References Cited

U.S. PATENT DOCUMENTS

| | | | |
|---|---|---|---|
| 4,057,690 A | 11/1977 | Vagliani et al. | 179/15 AS |
| 4,359,604 A | 11/1982 | Dumont | 179/1 SC |
| 4,410,763 A | 10/1983 | Strawczynski et al. | 364/513.5 |
| 4,672,669 A | 6/1987 | DesBlache et al. | 381/46 |
| 4,688,256 A | 8/1987 | Yasunaga | 381/46 |
| 4,764,966 A | 8/1988 | Einkauf et al. | 381/46 |
| 4,825,384 A | 4/1989 | Sakurai | 364/513.5 |
| 4,829,578 A | 5/1989 | Roberts | 381/46 |
| 4,864,608 A | 9/1989 | Miyamoto et al. | 379/409 |
| 4,914,692 A | 4/1990 | Hartwell et al. | 379/410 |
| 5,048,080 A | 9/1991 | Bell et al. | 379/165 |
| 5,125,024 A | 6/1992 | Gokeen et al. | 379/88 |
| 5,155,760 A | 10/1992 | Johnson et al. | 379/67 |
| 5,220,595 A | 6/1993 | Uehara | 379/74 |
| 5,239,574 A | 8/1993 | Brandman et al. | 379/88 |
| 5,349,636 A | 9/1994 | Irribarren | 379/89 |
| 5,394,461 A | 2/1995 | Garland | 379/106 |
| 5,416,887 A | 5/1995 | Shimada | 395/2.42 |
| 5,434,916 A | 7/1995 | Hasegawa | 379/406 |
| 5,475,791 A | 12/1995 | Schalk et al. | 395/2.42 |
| 5,577,097 A | 11/1996 | Meek | 379/3 |
| 5,652,828 A | 7/1997 | Silverman | 395/2.69 |
| 5,708,704 A | 1/1998 | Fisher | 379/410 |
| 5,749,067 A * | 5/1998 | Barrett | 704/233 |
| 5,761,638 A | 6/1998 | Knittle et al. | 704/233 |
| 5,765,130 A | 6/1998 | Nguyen | 704/233 |
| 5,784,454 A | 7/1998 | Patrick et al. | 379/406 |
| 5,937,375 A * | 8/1999 | Nakamura | 704/215 |
| 5,956,675 A | 9/1999 | Setlur et al. | 704/231 |
| 5,978,763 A | 11/1999 | Bridges | |
| 6,018,711 A | 1/2000 | French-St. George et al. | 704/275 |
| 6,061,651 A | 5/2000 | Nguyen | 704/233 |
| 6,098,043 A | 8/2000 | Forest et al. | 704/270 |
| 6,246,986 B1 | 6/2001 | Ammicht et al. | 704/270 |
| 6,266,398 B1 | 7/2001 | Nguyen | 379/88.01 |
| 6,279,017 B1 | 8/2001 | Walker | 707/529 |
| 6,393,396 B1 * | 5/2002 | Nakagawa et al. | 704/233 |
| 6,418,216 B1 * | 7/2002 | Harrison et al. | 379/208.01 |
| 6,526,382 B1 | 2/2003 | Yuschik | 704/275 |
| 6,556,967 B1 * | 4/2003 | Nelson et al. | 704/233 |
| 6,574,595 B1 | 6/2003 | Mitchell et al. | 704/242 |
| 6,574,601 B1 * | 6/2003 | Brown et al. | 704/270.1 |
| 6,647,363 B2 | 11/2003 | Claassen | 704/1 |
| 6,785,365 B2 * | 8/2004 | Nguyen | 379/88.01 |
| 7,016,850 B1 * | 3/2006 | Cox et al. | 704/503 |
| 7,047,197 B1 * | 5/2006 | Bennett | 704/275 |
| 7,062,440 B2 * | 6/2006 | Brittan et al. | 704/266 |
| 7,069,221 B2 | 6/2006 | Crane et al. | 704/275 |
| 7,143,039 B1 * | 11/2006 | Stifelman et al. | 704/270 |
| 7,162,421 B1 * | 1/2007 | Zeppenfeld et al. | 704/233 |
| 7,412,382 B2 * | 8/2008 | Noda et al. | 704/233 |
| 7,437,286 B2 * | 10/2008 | Pi et al. | 704/233 |
| 7,480,620 B2 * | 1/2009 | Bennett | 704/275 |
| 7,660,718 B2 * | 2/2010 | Padhi et al. | 704/268 |
| 7,673,340 B1 * | 3/2010 | Cohen et al. | 726/22 |
| 8,180,025 B2 * | 5/2012 | Pieraccini et al. | 379/88.02 |
| 2002/0152066 A1 * | 10/2002 | Piket | 704/226 |
| 2002/0165711 A1 * | 11/2002 | Boland | 704/231 |
| 2004/0064314 A1 * | 4/2004 | Aubert et al. | 704/233 |
| 2004/0122667 A1 * | 6/2004 | Lee et al. | 704/233 |
| 2006/0111901 A1 * | 5/2006 | Woo | 704/233 |
| 2006/0200345 A1 * | 9/2006 | Kooiman | 704/233 |
| 2006/0247927 A1 * | 11/2006 | Robbins et al. | 704/225 |
| 2006/0265224 A1 * | 11/2006 | Bennett | 704/246 |
| 2008/0103761 A1 * | 5/2008 | Printz et al. | 704/9 |
| 2008/0147397 A1 * | 6/2008 | Konig et al. | 704/246 |
| 2008/0154601 A1 * | 6/2008 | Stifelman et al. | 704/251 |
| 2008/0172225 A1 * | 7/2008 | Kim et al. | 704/233 |
| 2008/0228478 A1 * | 9/2008 | Hetherington et al. | 704/233 |
| 2008/0310601 A1 * | 12/2008 | Pi et al. | 379/88.01 |
| 2009/0089053 A1 * | 4/2009 | Wang et al. | 704/233 |
| 2009/0132255 A1 * | 5/2009 | Lu | 704/275 |

OTHER PUBLICATIONS

Kwon, et al.; Unsupervised Speaker Indexing Using Generic Models; IEEE Transactions on Speech and Audio Processing; vol. 3, No. 5; Sep. 2005; pp. 1004-1013.

Martin, Rainer; Noise Power Spectral Density Estimation Based on Optimal Smoothing and Minimum Statistics; IEEE Transactions on Speech and Audio Processing; vol. 9, No. 5; Jul. 2001; pp. 504-512.

European Patent Office—Extended European Search Report; Application No. 08006389.4-2225; Sep. 1, 2008.

Ljolje, A. et al., "Discriminative Training of Multi-State Barge-In Models," *IEEE*, Dec. 1, 2007, pp. 353-358.

Ittycheriah, A., et al., "Detecting User Speech in Barge-In Over Prompts Using Speaker Identification Methods," *Eurospeech'99*, Sep. 5, 1999, pp. 327-330.

Rose, R., et al., "A Hybrid Barge-In Procedure for More Reliable Turn-Taking in Human-Machine Dialog Systems," *IEEE*, Nov. 30, 2003, pp. 198-203.

Setlur, A., et al., "Recognition-Based Word Counting for Reliable Barge-In and Early Endpoint Detection in Continuous Speech Recognition," *5th International Conference on Spoken Language Processing*, Oct. 1, 1998, pp. 168-171.

European Patent Office—Extended European Search Report; Application No. 08013196.4-2225; Sep. 19, 2008.

* cited by examiner

DETECTING BARGE-IN IN A SPEECH DIALOGUE SYSTEM

RELATED APPLICATIONS

This application claims priority under 35 U.S.C. §119(a)-(d) or (f) of European Patent Application Serial Number 08 006 389.4, filed Mar. 31, 2008, titled METHOD FOR DETERMINING BARGE-IN, which application is incorporated in its entirety by reference in this application.

BACKGROUND OF THE INVENTION

1. Field of the Invention

The invention, in general, is directed to speech dialogue systems, and, in particular, to detecting barge-in in a speech dialogue system.

2. Related Art

Speech dialogue systems are used in different applications in order to allow a user to receive desired information or perform an action in a more efficient manner. The speech dialogue system may be provided as part of a telephone system. In such a system, a user may call a server in order to receive information, for example, flight information, via a speech dialogue with the server. Alternatively, the speech dialogue system may be implemented in a vehicular cabin where the user is enabled to control devices via speech. For example, a hands-free telephony system or a multimedia device in a car may be controlled with the help of a speech dialogue between the user and the system.

During the speech dialogue, a user is prompted by the speech dialogue system via speech prompts to input his or her wishes and any required input information. In most prior art speech dialogue systems, a user may utter his or her input or command only upon completion of a speech prompt output. Any speech activity detector and/or speech recognizer is activated only after the output of the speech prompt is finished. In order to recognize speech, a speech recognizer has to determine whether speech activity is present. To do this, a segmentation may be performed to determine the beginning and the end of a speech input.

Some speech dialogue systems allow a so-called "barge-in." In other words, a user does not have to wait for the end of a speech prompt but may respond with a speech input during output of the speech prompt. In this case, the speech recognizer, particularly the speech activity detecting or segmentation unit, has to be active during the outputting of the speech prompt. Allowing barge-in generally shortens a user's speech dialogue with the speech dialogue system.

To avoid having the speech prompt output itself erroneously classified as a speech input during the outputting of a speech prompt, different methods have been proposed. U.S. Pat. No. 5,978,763 discloses voice activity detection using echo return loss to adapt a detection threshold. According to this method, the echo return loss is a measure of the attenuation, i.e., the difference (in decibels), between the outgoing and the reflected signal. A threshold is determined as the difference between the maximum possible power (on a telephone line) and the determined echo return loss.

U.S. Pat. No. 7,062,440 discloses monitoring text-to-speech output to effect control of barge-in. According to this disclosure, the barge-in control is arranged to permit barge-in at any time but only takes notice of barge-in during output by the speech system on the basis of a speech input being recognized in the input channel.

A method for barge-in acknowledgement is disclosed in U.S. Pat. No. 7,162,421. A prompt is attenuated upon detection of a speech input. The speech input is accepted and the prompt is terminated if the speech corresponds to an allowable response. U.S. Pat. No. 7,212,969 discloses dynamic generation of a voice interface structure and voice content based upon either or both user-specific controlling function and environmental information.

A further possibility is described in A. Ittycheriah et al., *Detecting User Speech in Barge-in over Prompts Using Speaker Identification Methods*, in ESCA, EUROSPEECH 99, IISN 10108-4074, pages 327-330. Here, speaker-independent statistical models are provided as Vector Quantization Classifiers for the input signal after echo cancellation, and standard algorithms are applied for speaker verification. The task is to separate speech of the user and background noises under the condition of robust suppression of the prompt signal.

Accordingly, there is a need to provide a method and an apparatus for detecting barge-in in a speech dialogue system more accurately and more reliably.

SUMMARY

A method for determining barge-in in a speech dialogue system is disclosed, where the method determines whether a speech prompt is output by the speech dialogue system, and detects whether speech activity is present in an input signal based on a time-varying sensitivity threshold and/or based on speaker information, where the sensitivity threshold is increased if output of the speech prompt is determined and decreased if no output of a speech prompt is determined.

Thus, during output of a speech prompt or even if no speech prompt is output, a speech recognizer is active and speech activity may be detected, although the speech activity detection threshold (i.e., the sensitivity threshold) may be increased during the time during which there is a speech prompt output. Alternatively or additionally, the detection of speech activity may be based on information about a speaker, i.e., a person using the speech dialogue system. Such criteria allow the reliable adaptation of the speech dialogue system to the particular circumstances. The speaker information may also be used to determine and/or modify the time-varying sensitivity threshold.

Also disclosed is a speech dialogue system configured to detect barge-in, where the speech dialogue system may include a prompter operationally enabled to output one or more speech prompts from the speech dialogue system, and a speech activity detector for detecting whether speech activity is present in an input signal based on a time-varying sensitivity threshold and/or based on speaker information, where the sensitivity threshold of the speech activity detector is increased if output of a speech prompt is determined and decreased if no output of the speech prompt is determined.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon

DETAILED DESCRIPTION

Figure 1:
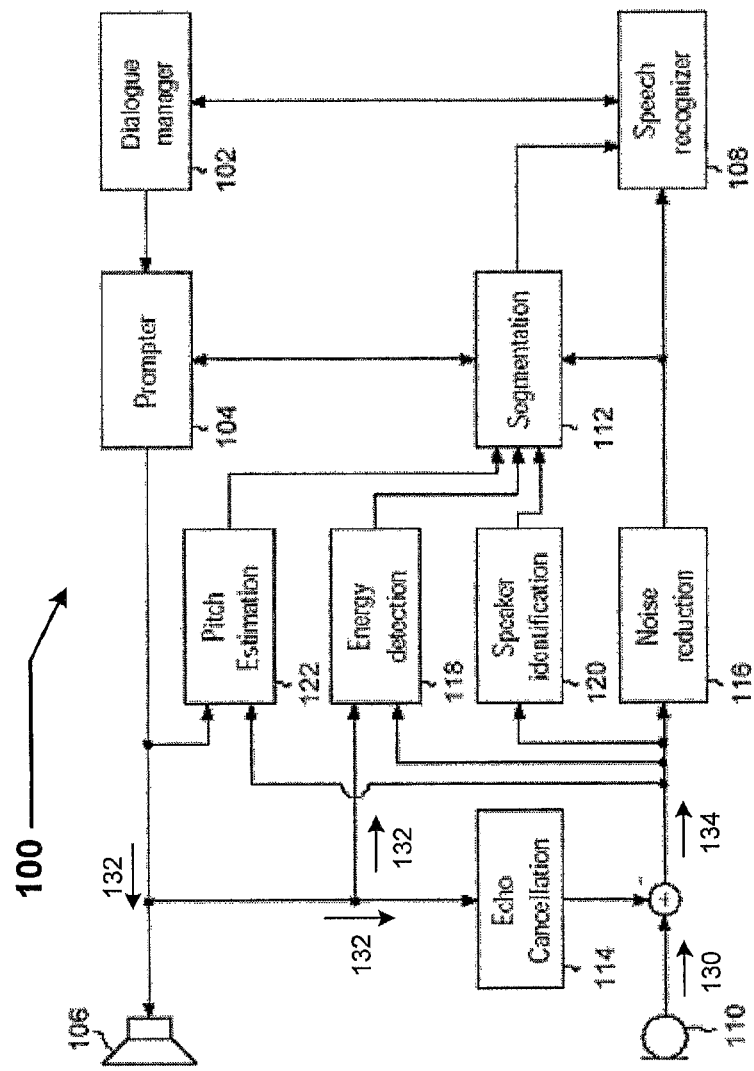
FIG. 1 shows a block diagram of an example of a speech dialogue system.

FIG. 1 shows a block diagram of a speech dialogue system 100 that is configured to detect barge-in by detecting speech activity in an input signal based on a time-varying sensitivity threshold of a speech activity detector and/or speaker information. The speech dialogue system may include a dialogue manager 102. The dialogue manager 102 may contain scripts for one or more dialogues. These scripts may be provided, for example, in Voice Extensible Markup Language ("VoiceXML"). The speech dialogue system may also include a prompter 104 that is responsible for translating the scripts from text to speech and to initiate output of a speech prompt via a loudspeaker 106.

Figure 2:
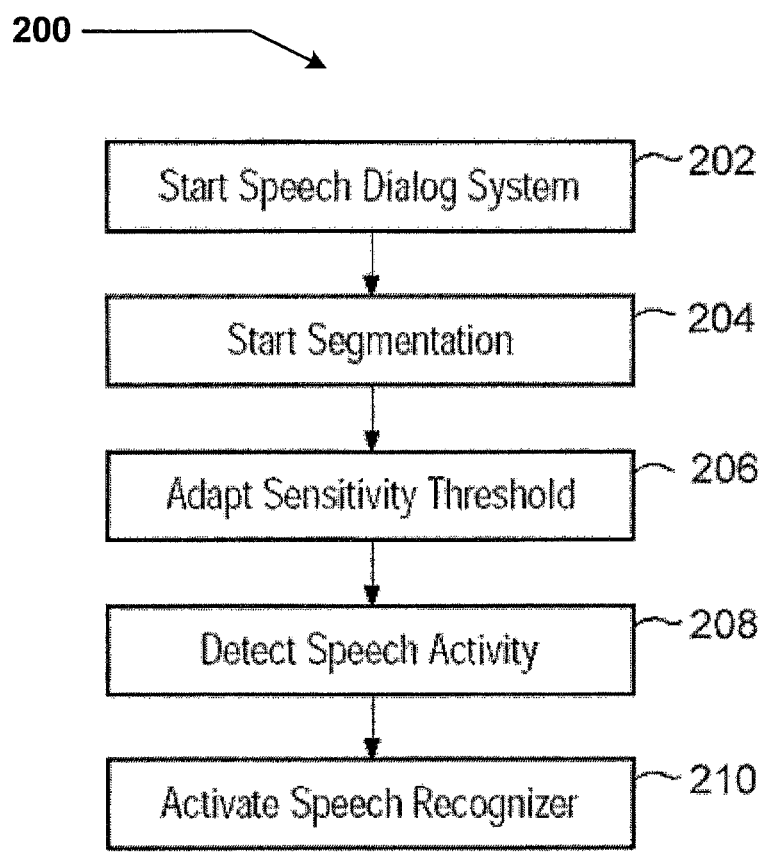
FIG. 2 shows a flow diagram of an example of a method for detecting barge-in in a speech dialogue system.

During operation, the speech dialogue system 100 may be started as illustrated in step 202 of FIG. 2. The speech dialogue system 100 may be started, for example, by calling a corresponding speech dialogue server or by activating a device that may be controlled by a speech command and, then, pressing a push-to-talk key or a push-to-activate key. Upon start or activation of the speech dialogue system 100, the dialogue manager 102 loads a predetermined dialogue script.

The speech dialogue system 100 may also include a speech recognizer 108 for performing speech recognition on speech input from a user received via microphone 110. Upon start of the speech dialogue system 100, a speech activity detector may be activated as well. The speech activity detector may be provided in the form of a segmentation module 112. This segmentation module 112 may be configured to determine the beginning and the end of a speech component in an input signal (microphone signal) received from the microphone 110. A corresponding step 204 is found in FIG. 2. (The microphone 110 may be part of a microphone array (not shown), in which case, a beamformer module would be provided as well.) Alternatively, the input signal may be received via telephone line; this may be the case if a user in a vehicle communicates by telephone (via a hands-free system) with an external information system employing a speech dialogue system.

If an occurrence of a speech signal is detected by the segmentation module 112, the speech recognizer 108 is started and processes the utterance in order to determine an input command or any other kind of input information. The determined input is forwarded to the dialogue manager 102 that either initiates a corresponding action or continues the dialogue based on this speech input.

In order to increase reliability of the speech recognizer 108, the microphone 110 input signal 130 may undergo an echo cancellation process using echo canceller 114. The echo canceller 114 receives the speech prompt signal 132 to be output via loudspeaker 106. This speech prompt signal 132 may be subtracted from the input signal to reduce any echo components in the input signal. Furthermore, an additional noise reduction unit 116 may be provided to remove additional noise components in the input signal 130, for example, using corresponding filters.

In order to allow the speech dialogue system 100 to detect barge-in, the sensitivity threshold of the speech activity detector or the segmentation module 112 has to be set to a suitable level. The information used to set or adapt the sensitivity threshold may stem from different sources. In any case, at the beginning, the sensitivity threshold of the segmentation module 112 may be set to a predefined initial value.

Then, the sensitivity threshold may be modified and set depending on whether a speech prompt output currently is present or not. In particular, if a speech prompt is output, the current sensitivity threshold may be increased to avoid the speech prompt output itself being detected as speech activity in the input signal. In this case, increasing the sensitivity threshold renders the segmentation more insensitive during output of a speech prompt. Thus, the sensitivity of the segmentation with respect to background noise is reduced during playback of a speech prompt. The increased sensitivity threshold may be a constant (predefined) value or may be a variable value. For example, the increased sensitivity threshold may further depend on the volume of the speech prompt output and may be chosen to be a higher value in case of high volume and a lower value in case of lower volume.

Determining whether a speech prompt is currently output may be performed in various ways. In the speech dialogue system 100, a speech prompt signal 132 is the signal to be output by a loudspeaker 106. In particular, the step of determining whether a speech prompt output signal ha been output may include receiving a loudspeaker output signal or a speech prompt output signal 132 at a component of the speech dialogue system 100. According to another alternative, the prompter 104 or the dialogue manager 102 may inform the segmentation module 112 or the speech recognizer 108 each time outputting of a speech prompt is initiated. In this way, output of a speech prompt may be determined simply and reliably.

According to yet another alternative, the reference signal used for the echo cancellation module 114, i.e., the loudspeaker signal 132, may be fed to an energy detection module 118. In energy detection module 118, the signal level of the loudspeaker signal may be determined. If the signal level exceeds a predetermined threshold, it may be determined that a speech prompt signal is present on the loudspeaker path. Then, a corresponding signal may be forwarded to the segmentation module 112 such that a corresponding adaptation, i.e., an increase, of the sensitivity threshold is performed. As soon as no speech prompt output is present, the sensitivity threshold may again be decreased, e.g., to the initial value.

In addition or alternatively, the sensitivity threshold may be adapted in step 203 of FIG. 2 based on a speaker identification. For this purpose, the microphone signal 130 is fed to speaker identification module 120. In this module, a speaker is identified by methods such as are disclosed, for example, in Kwon et al., *Unsupervised Speaker Indexing Using Generic Models*, IEEE Trans. on Speech and Audio Process., Vol. 13, pages 1004-1013 (2005).

In this way, it may be determined which particular speaker (possibly out of a set of known speakers) is using the speech dialogue system. In speaker identification module 120, a statistical model may be provided for different speakers with respect to their respective barge-in behaviour. This statistical model may be established, for example, by starting with a speaker-independent model that is then adapted to a particular speaker after each speech input. Possible parameters for the statistical model are the speaker identity, the absolute or relative number that a particular dialogue step in a dialogue is performed by the speaker, an a priori probability for barge-in in a particular dialogue step, the time of the barge-in incident, and/or the number of rejected barge-in recognitions.

Via a statistical evaluation of a user behaviour, a sensitivity threshold may be adapted. It is desirable to reduce the number of erroneous detections of speech activity as these lead to an increase of the sensitivity threshold resulting in an increase of misdetections. This effect can be reduced by incorporating in the statistical model the probability for a wrong decision for barge-in that led to abortion of a dialogue step. By adapting the sensitivity threshold based on this information, knowledge about the speaker's identity and his or her typical behaviour may be used as a basis for the segmentation.

For example, it may be known that a particular user does not perform any barge-in. In this case, the sensitivity threshold during speech prompt output may be set to a higher value compared to the case of a predefined normal threshold value during playback of a speech prompt. Additionally, detecting a speaker's identity may include determining a probability value or a confidence value with respect to a detected speaker's identity. This probability or confidence value may be combined with other information sources when adapting the sensitivity threshold.

Detecting whether speech activity is present in a received input signal (step 204 of FIG. 2), i.e., segmenting, may be based on different detection criteria. For example, a pitch value such as a pitch confidence value may be determined. The pitch confidence value is an indication about the certainty that a voiced sound has been detected. In case of unvoiced signals or in speech pauses, the confidence value is small, e.g., near zero. In case of voiced utterances, the pitch confidence value approaches 1; preferably only in this case, a pitch frequency is evaluated. For example, determining a pitch confidence value may comprise determining an auto-correlation function of the input signal.

For this purpose, the microphone signal 130 may be fed to a pitch estimation module 122. Here, based on the auto-correlation function of the received input signal (i.e., the microphone signal 130), a pitch confidence value, such as a normalized confidence pitch value, may be determined. In order to determine whether speech activity is present, the determined pitch confidence value may be compared to a predetermined threshold value. If the determined pitch confidence value is larger than the predetermined pitch threshold, it is decided that speech input is present. In this case, alternatively, a probability value or a confidence value with respect to whether speech input is present may be determined. These values may then be combined with corresponding probability or confidence values stemming from other criteria to obtain an overall detection criterion.

The pitch threshold may be given in a time-varying and/or speaker-dependent manner. In particular, in the case of a speech prompt output, a pitch threshold may be set to a predefined higher value than in case of no speech prompt being output. Similarly, the predetermined pitch threshold may be set depending on the determined speaker identity.

Alternatively or additionally, in order to detect speech activity, the loudspeaker signal 132 may also be fed to pitch estimation module 122. The (estimated) pitch frequency of the speech prompt signal (i.e., the loudspeaker signal 132) and of the microphone signal 130 are compared. If both pitch frequencies correspond to each other, it is decided that no speech activity is present. On the other hand, if the microphone signal and the loudspeaker signal show different values, speech activity may be considered to be present. Also, no decision need be made at this stage; it is also possible to only determine a corresponding probability or confidence value with regard to the presence of speech input.

More particularly, if the determined current pitch confidence value is high (i.e., above a predetermined threshold) for the input signal and for the speech prompt signal, and/or if the pitch frequency of the input signal is equal or almost equal to the pitch frequency of the prompt signal, no speech activity may be considered to be present. If the current pitch frequency of the input signal differs (e.g., by more than a predetermined threshold (which may be given as a percentage) from the current pitch frequency of the prompt signal, or if the pitch confidence value for the input signal is high and the pitch confidence value for the prompt signal is low (i.e., below a predetermined threshold), speech activity may be considered to be present.

Alternatively or additionally, a signal level-based segmentation may be performed. In such a case, the signal level of the background noise may be estimated in energy detection module 118. Such an estimation usually is performed during speech pauses. An estimation of the noise power density spectrum $\hat{S}_{nn}(\Omega_\mu, k)$ is performed in the frequency domain where $\Omega_\mu$ denotes the (normalized) center frequency of the frequency band $\mu$, and k denotes the time index according to a short time Fourier transform. Such an estimation may be performed in accordance with R. Martin, *Noise Power Spectral Density Estimation Based on Optimal Smoothing and Minimum Statistics*, IEEE Trans. Speech and Audio Process., T-SA-9(5), pages 504-512 (2001).

In order to detect speech activity, the power spectral density of the microphone signal may be estimated in energy detection module 118 as well. Speech activity is considered to be present if the power spectral density of the current microphone signal $S_{xx}(\Omega_\mu, k)$ in the different frequency bands is greater than the determined noise power spectral density times a predetermined factor $S_{xx}(\Omega_\mu, k) > \hat{S}_{nn}(\Omega_\mu, k) \cdot \beta$. The factor $\beta$, similar to the case of the pitch criterion, may be time-varying. In particular, the factor may be increased in the case of a speech prompt output and decreased if no speech prompt output is present. Similar to the criteria discussed above, no decision need be made based on this estimation only; it is also possible to only determine a corresponding probability or confidence value with regard to the presence of speech input.

During the whole process, an echo cancellation may be performed in echo cancellation module 114. In practice, after starting outputting a speech prompt, converging effects may occur during which the echo cancellation is not yet fully adjusted. In this case, the microphone signal (after subtracting the estimated echo signal) 134 may still contain artifacts of the speech prompt output. In order to avoid misclassification, the segmentation module 112 may be configured to start processing the signals only after a predetermined minimum time has passed after starting to output a speech prompt. For example, segmentation may start one second after the output of a speech prompt has started. During this time interval, the input signal is stored in memory, and multiple iterations of the echo canceller may be performed on this data. Thus, the quality of convergence after this initial time interval can be increased, resulting in a reliable adjustment of the adaptive filters.

In the above methods, the detecting step, step 208, FIG. 2, particularly the time-varying sensitivity threshold (or its determination), may be based on a plurality of information sources for a detection criterion. In particular, the detecting step may be based on the outcome of the steps of detecting a speaker identity, determining an input signal power density spectrum, and/or determining a pitch value for the input signal. The outcome of each of these steps may be given as a probability value or a confidence value. Then, the detecting step may include the step of combining the outcome of one or more of these steps to obtain a detection criterion for detecting whether speech activity is present.

If the different information sources yield probability or confidence values, the segmentation module 112 may combine these outcomes using a neural network in order to finally decide whether speech input is present or not. If segmentation module 112 considers speech activity being present, the detected utterance is forwarded to the speech recognizer 108 for speech recognition (step 205 of FIG. 2). At the same time, segmentation module 112 may send a signal to prompter 104 to interrupt, stop, or fade out the output of a speech prompt.

Additionally, a speech prompt may be modified based on a determined speaker identity. For example, the system may determine, based on the statistical model for a particular speaker, that this speaker always interrupts a particular prompt. In this case, this prompt may be replaced by a shorter version of the prompt or even omitted entirely.

Thus, based on different information sources such as presence or absence of a speech prompt output or a detected speaker identity (possibly with a corresponding statistical speaker model), the segmentation sensitivity threshold may be adapted. For adaptation, for example, a factor used for segmentation based on power spectral density estimation or a pitch threshold may be modified accordingly.

It will be understood, and is appreciated by persons skilled in the art, that one or more processes, sub-processes, or process steps described in connection with FIG. 2 may be performed by a combination of hardware and software. The software may reside in software memory internal or external to the dialogue manager 102, FIG. 1, or other controller, in a suitable electronic processing component or system such as one or more of the functional components or modules depicted in FIG. 1. The software in memory may include an ordered listing of executable instructions for implementing logical functions (that is, "logic" that may be implemented either in digital form such as digital circuitry or source code or in analog form such as analog circuitry), and may selectively be embodied in any tangible computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store, communicate, propagate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or medium. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic), and a portable compact disc read-only memory "CDROM" (optical) or similar discs (e.g., DVDs and Rewritable CDs). Note that the computer-readable medium may even be paper or another suitable medium upon which the program is printed, as the program can be electronically captured, via, for instance, optical scanning or reading of the paper or other medium, then compiled, interpreted or otherwise processed in a suitable manner if necessary, and then stored in the memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for detecting barge-in in a speech dialogue system, the method comprising:
   determining whether a speech prompt is being output by the speech dialogue system including receiving information from a prompter that initiates output of the speech prompt; and
   detecting whether speech activity is present in an input signal based on a time-varying sensitivity threshold of a speech activity detector, the sensitivity threshold used for segmentation to determine at least a beginning of speech activity,
   where the sensitivity threshold is increased if it is determined that a speech prompt is being output, and decreased if it is determined that no output of a speech prompt is being output,
   wherein the speech activity is considered present if a power density spectrum of the input signal is greater than a predetermined noise signal power spectrum times a predetermined factor and wherein the predetermined factor is increased if it is determined that a speech prompt is being output, and decreased if it is determined that no output of a speech prompt is being output.

2. The method of claim 1, where the step of determining whether a speech prompt is being output includes determining whether a signal level of a speech prompt from the prompt exceeds a predetermined threshold.

3. The method of claim 1, further including the step of determining an identity of a speaker of the input signal.

4. The method of claim 3, further including the step of modifying the sensitivity threshold based on the determined speaker identity.

5. The method of claim 4, further including the step of modifying a speech prompt from the prompter based on the determined speaker identity.

6. The method of claim 1, where the predetermined factor is a time-varying factor.

7. The method of claim 1, further including the step of determining a pitch value for the input signal.

8. The method of claim 7, where the detecting step comprises comparing the determined pitch value with a predetermined pitch threshold.

9. The method of claim 8, where the predetermined pitch threshold is based on a pitch value of the speech prompt signal.

10. The method of claim 1, including the step of performing an echo cancellation on the input signal by subtracting a speech prompt signal from the input signal.

11. The method of claim 10, where the step of determining whether a speech prompt is being output is not performed until a predetermined minimum time has passed after starting a speech prompt output.

12. The method of claim 1, further including the step of interrupting or fading out an output of a speech prompt if speech activity is detected in the input signal.

13. A non-transitory computer-readable medium for use with a computer system, said computer-readable medium comprising software code portions that, when executed on the computer system, perform steps comprising:
   determining whether a speech prompt is being output by the speech dialogue system including receiving information from a prompter that initiates output of the speech prompt; and detecting whether speech activity is present in an input signal based on a time-varying sensitivity threshold, the sensitivity threshold used for segmentation to determine at least a beginning of speech activity, where the sensitivity threshold is increased if it is determined that a speech prompt is being output, and decreased if it is determined that no output of a speech prompt is being output, wherein the speech activity is considered present if a power density spectrum of the input signal is greater than a predetermined noise signal power spectrum times a predetermined factor and wherein the predetermined factor is increased if it is determined that a speech prompt is being output, and decreased if it is determined that no output of a speech prompt is being output.

14. The computer-readable medium of claim 13, where the step of determining whether a speech prompt is being output includes determining whether a signal level of a speech prompt from the prompt exceeds a predetermined threshold.

15. The computer-readable medium of claim 13, further including software code portions that, when executed on the computer system, perform the step of determining an identity of a speaker of the input signal.

16. A speech dialogue system configured to detect barge-in, the speech dialogue system comprising:
    a prompter including a loudspeaker operationally enabled to output one or more speech prompts from the speech dialogue system; and
    a speech activity detector for detecting speech activity in an input signal based on a time-varying sensitivity threshold, wherein the speech activity detector includes a segmentation module configured to determine the beginning and the end of a speech component in the input signal based on the sensitivity threshold, including receiving information from a prompter that initiates output of the speech prompt
    where the sensitivity threshold of the speech activity detector is increased if output of a speech prompt is determined and decreased if no output of a speech prompt is determined, wherein the speech activity is considered present if a power density spectrum of the input signal is greater than a predetermined noise signal power spectrum times a predetermined factor and wherein the predetermined factor is increased if it is determined that a speech prompt is being output, and decreased if it is determined that no output of a speech prompt is being output.

17. The speech dialogue system of claim 16, including an echo cancellation module configured to subtract a speech prompt signal from the input signal.

18. The speech dialogue system of claim 16, including a pitch estimation module configured to compare an estimated pitch frequency of the input signal and an estimated pitch frequency of a speech prompt signal.

19. The speech dialogue system of claim 16, including an energy detection module configured to estimate the power spectral density of the input signal.

20. The speech dialogue system of claim 16, including a speaker identification module configured to determine which speaker of a plurality of speakers is using the speech dialogue.

21. The computer-readable medium of claim 16, where the step of determining whether a speech prompt is being output includes receiving information from a prompter that initiates output of the speech prompt.

22. A method for detecting barge-in in a speech dialogue system, the method comprising:

determining whether a speech prompt is being output by the speech dialogue system;
determining a statistical model associated to at least one speaker interacting with the speech dialogue system, the statistical model representing barge-in behavior of the speaker and includes:
    an identity of the speaker,
    a number that a particular dialogue step is performed by the speaker,
    a priori probability of barge-in for the particular dialogue step,
    a time of barge-in incident, and
    a number of rejected barge-in recognitions; and
detecting whether speech activity is present in an input signal based on a time-varying sensitivity threshold of a speech activity detector and based on the speaker information,
where the sensitivity threshold is adapted based on the statistical model of the identified speaker.

23. The method of claim 22 further including the step of modifying a speech prompt from the prompter based on the determined speaker identity.

24. A non-transitory computer-readable medium for use with a computer system, said computer-readable medium comprising software code portions that, when executed on the computer system, perform steps comprising:
    determining whether a speech prompt is being output by the speech dialogue system;
    and determining a statistical model associated to at least one speaker interacting with the speech dialogue system, the statistical model representing barge-in behavior of the speaker and includes:
    an identity of the speaker,
    a number that a particular dialogue step is performed by the speaker,
    a priori probability of barge-in for the particular dialogue step,
    a time of barge-in incident, and
    a number of rejected barge-in recognitions; and
    detecting whether speech activity is present in an input signal based on a time-varying sensitivity threshold and based on speaker information,
    where the sensitivity threshold is adapted based on the statistical model of the identified speaker is increased if it is determined that a speech prompt is being output, and decreased if it is determined that no output of a speech prompt is being output.

25. A speech dialogue system configured to detect barge-in, the speech dialogue system comprising:
    a prompter including a loudspeaker operationally enabled to output one or more speech prompts from the speech dialogue system; and
    a speaker identification module to determine a statistical model associated to at least one speaker interacting with the speech dialogue system, the statistical model representing barge-in behavior of the speaker and includes:
    an identity of the speaker,
    a number that a particular dialogue step is performed by the speaker,
    a priori probability of barge-in for the particular dialogue step,
    a time of barge-in incident, and
    a number of rejected barge-in recognitions; and
    a speech activity detector for detecting speech activity in an input signal based on a time varying sensitivity threshold and based on speaker information, where the sensitivity threshold is adapted based on the statistical model of the identified speaker is increased if it is determined that a speech prompt is being output, and decreased if it is determined that no output of a speech prompt is being output.

* * * * *